Sept. 19, 1961  G. PETERSON  3,001,065
METHOD AND MEANS OF TRANSDUCING ELASTIC WAVES
Filed April 28, 1958  7 Sheets-Sheet 1

INVENTOR.
Glen Peterson

Sept. 19, 1961   G. PETERSON   3,001,065
METHOD AND MEANS OF TRANSDUCING ELASTIC WAVES
Filed April 28, 1958   7 Sheets-Sheet 2

INVENTOR.
Glen Peterson

Sept. 19, 1961   G. PETERSON   3,001,065
METHOD AND MEANS OF TRANSDUCING ELASTIC WAVES
Filed April 28, 1958   7 Sheets-Sheet 3

INVENTOR.
Glen Peterson

Sept. 19, 1961  G. PETERSON  3,001,065
METHOD AND MEANS OF TRANSDUCING ELASTIC WAVES
Filed April 28, 1958  7 Sheets-Sheet 4

INVENTOR.
Glen Peterson

Sept. 19, 1961 G. PETERSON 3,001,065
METHOD AND MEANS OF TRANSDUCING ELASTIC WAVES
Filed April 28, 1958 7 Sheets-Sheet 6
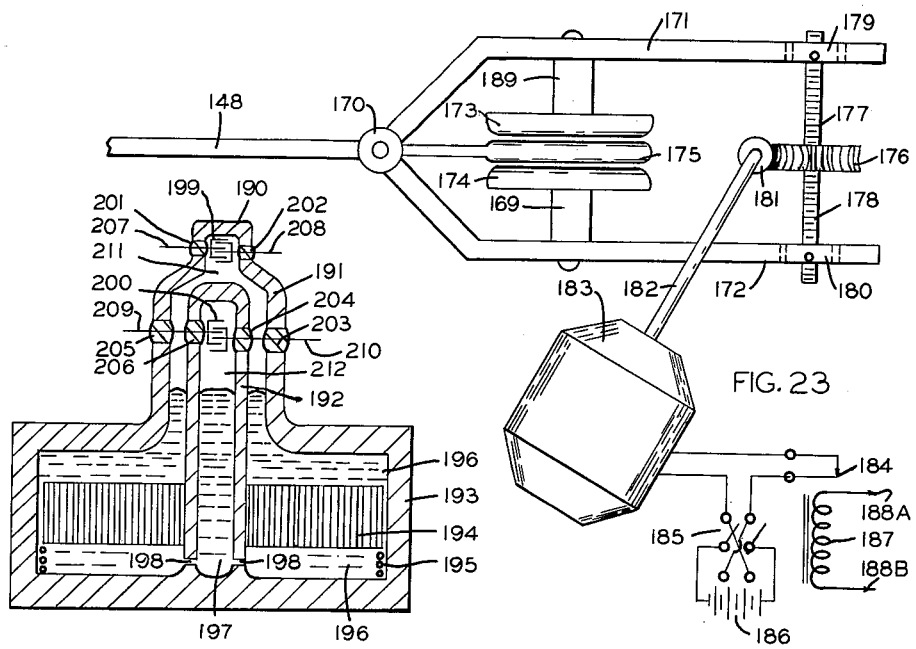
FIG. 23
FIG. 24
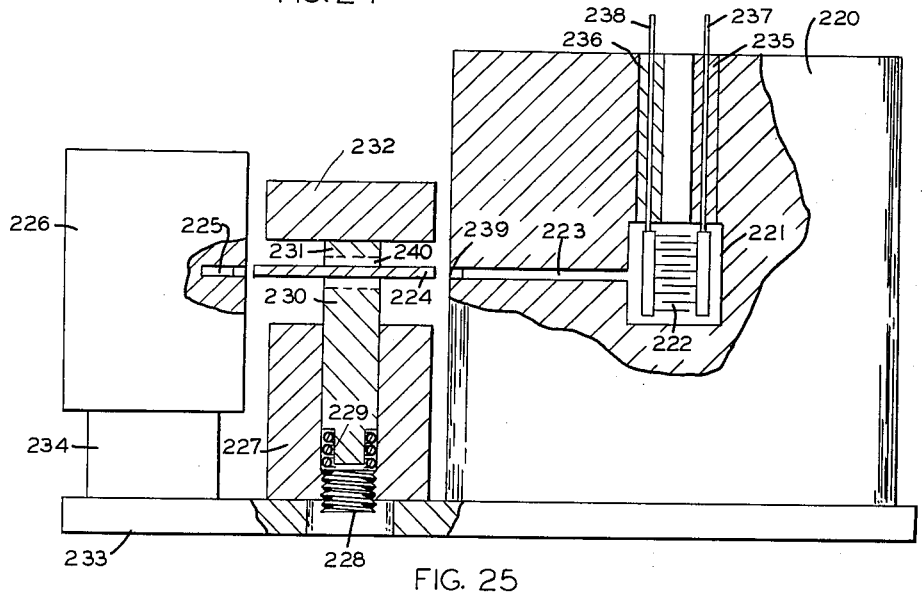
FIG. 25
INVENTOR.
Glen Peterson Sept. 19, 1961  G. PETERSON  3,001,065
METHOD AND MEANS OF TRANSDUCING ELASTIC WAVES
Filed April 28, 1958  7 Sheets-Sheet 7

INVENTOR.
Glen Peterson

United States Patent Office 3,001,065
Patented Sept. 19, 1961

3,001,065
METHOD AND MEANS OF TRANSDUCING
ELASTIC WAVES
Glen Peterson, 502 S. 83rd East Ave., Tulsa, Okla.
Filed Apr. 28, 1958, Ser. No. 731,484
27 Claims. (Cl. 250—17)

This invention relates to a radio geophone as may be required in or used by a system of seismic exploration, and is a continuation in part of my co-pending patent application, Serial Number 145,279, filed February 20, 1950, now U.S. Patent 2,840,695. This patent covers the general case and in particular single-ended types of radio geophones. The present application is concerned primarily with push-pull, balanced or differential types of radio geophones. Speaking broadly, however, my invention is concerned with apparatus and methods which directly produce radio waves when activated by an incident transient or continuous elastic wave displacement such as occurs in the earth when an explosive charge is detonated in a bore hole.

Heretofore, in the art of geophysical prospecting, subterranean geological formations have been mapped by firing an explosive charge at a shot point near the surface of the earth and determining, at one or more points, remote from the shot-point, the time required for the explosion waves to be elastically propagated from the shot point to the points at which the waves are measured. Ordinarily, the elastic waves in the earth are picked up by magnetic types of geophones and, in previous systems, the geophones were connected to the recording vehicle by means of a long multi-conductor cable. At the recording vehicle, the signals were fed to a set of electronic amplifiers and thence to a recorder which furnished an indication of the seismic waves at each geophone station.

It has been recognized that greatly improved results might be obtained if the connecting cables between the geophones and the recording vehicle could be eliminated, as the use of such cables substantially limits the use of the prior art system to relatively accessible and smooth areas. The cable also provides a definite limit to the distance between the recording vehicle and the various geophone stations, as well as limiting the arrangement of geophones about the point of interest.

Standard types of radio transmitters long known to the art of radio communications are much too bulky, heavy and costly to be used at each of a multiplicity of geophone stations in a seismic system; consequently, I sought a true radio geophone which had all of the advantages of the permanent magnet low-frequency geophone but which produced pulses of radio frequency energy rather than the transients of very low-frequency content.

An object of my invention is to convert as directly as possible a portion of the energy of motion of a seismically disturbed earth into radio frequency energy and to radiate the same from an antenna.

A second object of my invention is to release from a battery, or other suitable storage device, under the control of an incident seismic disturbance, additional energy which likewise is converted as directly as possible into radio frequency energy and radiated from a suitable antenna.

A third object of my invention is to provide a radio geophone which consumes and radiates appreciable power only when elastic waves are incident upon it.

A fourth object is to provide a balanced, push-pull or differential type of radio geophone.

These and further objects and advantages and novel features of my invention will become apparent from the following detailed description taken with the appended drawings, in which:

FIGURE 23 is a schematic drawing of a continuously adjustable dynamic spark gap.

FIGURE 24 is a schematic drawing of a pressure variant dynamic spark gap.

FIGURE 25 is a schematic drawing of a radiant energy actuated dynamic spark gap.

Figures 1, 2:
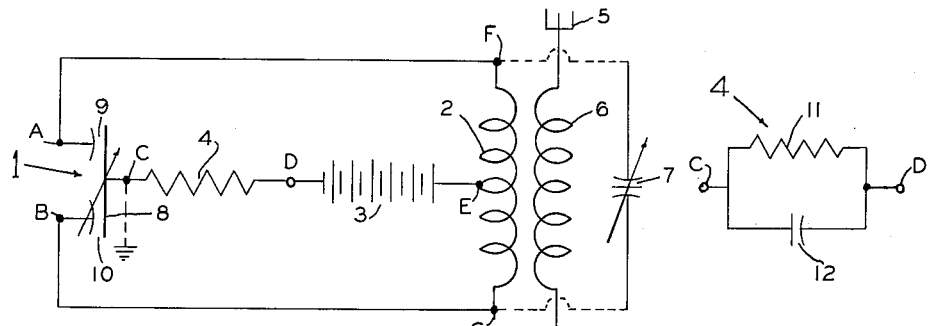
FIGURE 1 is a schematic diagram of the push-pull, balanced, or differential type of radio geophone circuit.
FIGURE 2 is a schematic of the preferred form of ballast impedance used in the radio geophone circuit.
Figure 3:
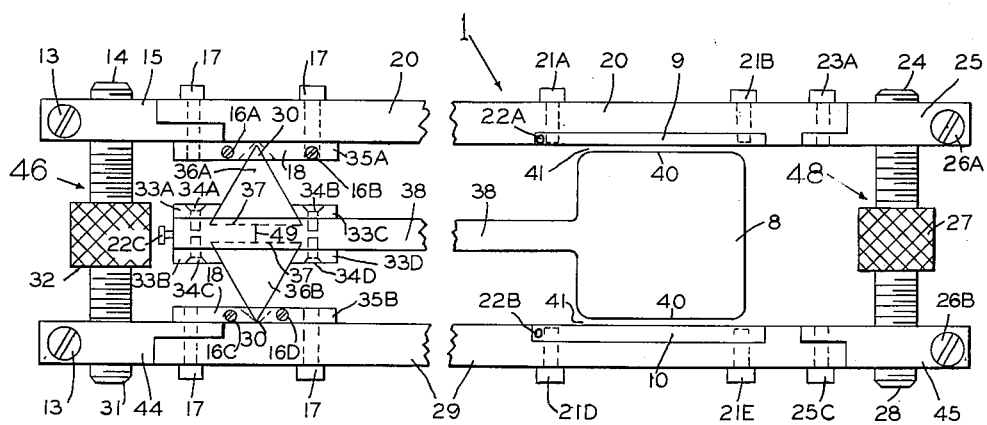
FIGURE 3 is a side elevation showing the mechanical construction of one form of shock-excited dynamic spark gap.
Figures 4, 5:
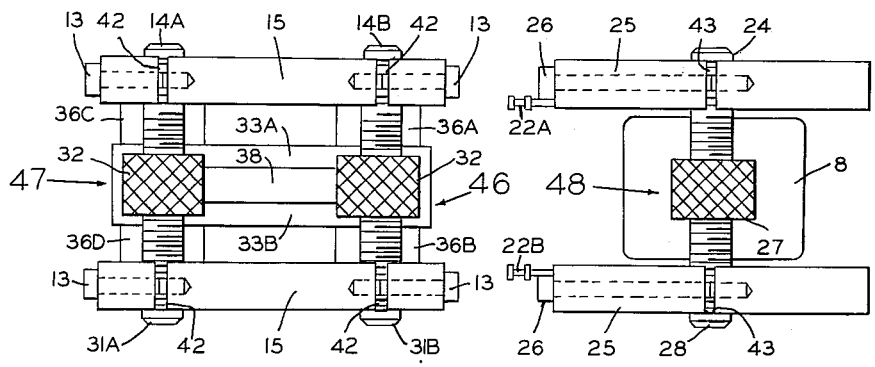
FIGURE 4 is the left-end elevation of the structure of FIGURE 3.
FIGURE 5 is the right-end elevation of the same structure.
Figure 6:
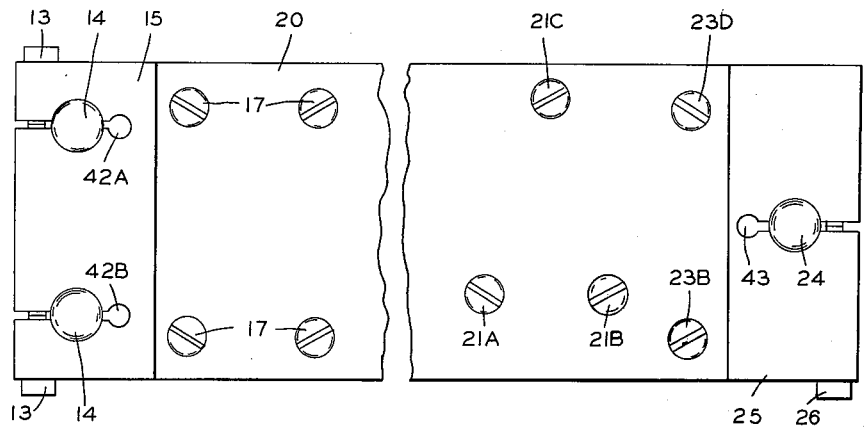
FIGURE 6 is a plan view of the shock-excited dynamic spark gap.
Figure 8:
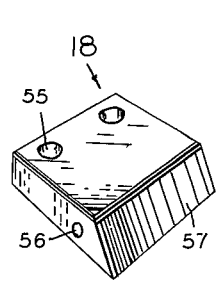
FIGURE 8 is a detail of the wedging block used in the foregoing structure.
Figure 9:
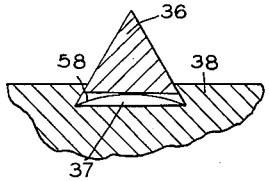
FIGURE 9 is a detail showing the spring suspension of the insulating wedge in the above structure.

My initial idea was, as stated in my co-pending patent application, above referenced, to use a push-pull type of dynamic condenser in a circuit such as that of FIG. 1. Therein 1 is the push-pull type of dynamic condenser composed of stator plates 9 and 10 rigidly fastened to but insulated from a supporting structure, shown in FIG. 3 and 8 is the movable condenser plate elastically mounted to the same supporting structure but having sufficient mass as to be adequately coupled to the earth's gravitational field. The preferred arrangement is such that when 9 moves toward 8, 10 moves away from 8 by like amount, it being considered that 8 is stationary in the earth's gravitational field. This type of action can readily be accommodated by a structure wherein 9 and 10 are flat plates, as shown by FIG. 3, and suspended between them is the third plate or electrode 8. If these condenser plates are given a potential difference, as by battery 3, so that an intense electrostatic field exists between them, the motion of these plates relatively to each other, as described above, will cause an alternating current to flow in the circuit composed of radio frequency coil 2 and dynamic condenser 1. In my first model, the condenser plates were made as flat and smooth as possible and their separation set at about .0005 inch. With this arrangement, if care was taken to properly round the edges of the condenser plates, a potential difference of 300 or 400 volts could be maintained between them, with air at atmospheric pressure serving as the dielectric.

With plates 2.250 inches in diameter, separated and charged as above, a motion of .000001 inch will release a pulse of 36 micro watts into the radio-frequency circuit composed of 1 and 2, as already described, and antenna 5 in series with secondary coil 6, the latter being inductively coupled to primary coil 2. An auxiliary tuning condenser 7 may be used if desired but it is sufficient to resonate the circuit with the series capacity of 1 since this capacity is fixed by the effective separation of 9 and 10 and remains constant throughout their motion relatively to 8. An impedance 4 which is preferably a resistance 11 in parallel with a capacity 12, as shown in FIG. 2, may be provided in the central arm between condenser plate 8 and battery 3, as shown. The purpose of this resistor initially was to act as a protective load in the event the condenser plates happened to short together. It will be noted later that this resistor, or in the more general case, the ballast impedance 4 serves a more useful and fundamental purpose.

My original conception was that if the differential capacity change in 1 was both sudden and large, and of a transient character, the energy released into the radio-frequency circuit A, B, C, G, F, A, FIG. 1, might be dissipated as a radio-frequency wave, a portion of which would be radiated from antenna 5. Thus, if the apparatus were placed in intimate contact with a seismically disturbed earth, radio frequency pulses would be radiated from antenna 5 for each incident seismic pulse. Indeed, this proved to be the case when the apparatus was tested experimentally; radio frequency energy was created and radiated when the dynamic condenser was actuated; but the energy thus radiated was considerably in excess of that calculated above. It turned out, upon further investigation, that the required sudden and large capacity change was obtained by the condenser plates moving sufficiently close to partially break down the air dielectric separating them. Thus, what was designed to be a dynamic condenser became a highly quenched dynamic spark gap.

It is a well-known fact that a multiplicity of short spark gaps in parallel are as efficient in producing high power radio frequency transients as a single long spark gap; moreover, such a multiplicity of short spark gaps quench much more rapidly than a single long gap; i.e., the spark dies out more rapidly so that the primary circuit isn't loaded an unnecessarily long time—a condition which greatly increases the effectiveness of the radio frequency currents generated. Wien, I believe, was the first to make use of this principle and before the advent of the thermionic vacuum tube, considerable use was made of the quenched spark gap in radio telegraphy.

The preferred form of my radio geophone may be said to employ two high capacity spark gaps which are differentially connected and which have moving electrodes. However, these gaps appear to work without there being any visible evidence of sparking; i.e., without the emission of light and at potential differences across the plates as low as .01 volt. Too, when the potential difference across the plates is raised to the point where visible sparks occur, the production of the radio frequency transients is only slightly altered. Yet it seems very certain that a conduction process is required, for when thin insulating strips, such as onion skin paper, are inserted between the plates the radio frequency transients are no longer produced.

Figure 17:
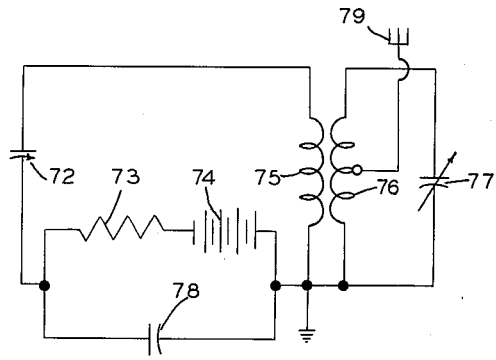
FIGURE 17 is a schematic circuit diagram of a single-ended radio geophone circuit employing a spark gap.

While I have demonstrated that single-ended circuits, as illustrated schematically by FIG. 17, work satisfactorily under some conditions, the balanced, push-pull or differential circuit is preferred. Using the balanced circuit, ground displacements as small as $10^{-7}$ inches will produce radio waves which can be picked up at a considerable distance.

Referring now to FIGURES 1, 2 and 3 for a detailed discussion, suppose that initially the dynamic gap plates are adjusted so that 8 and 9 have the same separation as 8 and 10. Let the battery 3 voltage be adjusted so that the condenser gaps are on the thresh-hold of conduction, or a little beyond. This adjustment is not critical since the two gaps are equal and current flowing across both cancels in the inductance 2. In fact, a very good way to adjust the gap plates is to set them so that the radio-frequency output is substantially zero when the plates are not in motion and the battery 3 voltage is a little greater than break-down.

With the dynamic gap adjusted as above, suppose that plates 9 and 10 acting as one mass are set in relative motion with plate 8 acting as another mass, then as first gap 8, 9 is shorter, and then the gap 8, 10—the conduction across the differentially connected gaps is no longer equal and the radio frequency currents generated in inductance 2 no longer cancel. Under these conditions energy is periodically radiated from the antenna 5, the periodicity being determined by the driving force which unbalances the spark gap.

When the initial separation of the gap plates is of the order of .0005 inch or less, it can be seen that the instrument is sensitive to unbalances considerably smaller than this—perhaps as small as $10^{-8}$ inches. How sensitive the differentially connected dynamic spark gap is to small motions of course depends upon how accurately the initial balance can be made. This, in turn, depends upon the flatness of the plates and how nearly they can be kept in parallel alignment. To put it another way, best results can be obtained when the motion is always perpendicular to the plate faces at all points, and not in the least bit schew; i.e., when the desired motion is at every point along a line of electric force. Under these conditions, conduction, the conduction will be more or less uniform, arising from a multiplicity of points and not just one or two. Moreover, the energy change is greatest for motion along a line of force.

The exact functioning of ballast impedance element 4, composed preferably of resistance 11 and capacitor 12, can now be explained. When conduction takes place across a gap, 12 is charged to the potential of the battery 3. During the interval when there is no conduction across a gap, 12 is discharged through 11. Thus the time constant of 11 and 12 should for best results be sufficiently small compared with the periodicity of the gap plates that 12 always has sufficient time to become substantially discharged in the interval when there is no conduction across a gap.

In addition to the functions already disclosed, the resistance 11 serves at least two other important purposes. Should one or both of the gaps draw more charge than 12 can hold, the difference must be supplied through 11, consequently, an IR drop is built up across 11 which effectively lowers the potential across the gap plates and so greatly assists in the quenching process. Too, and perhaps this is the most important point of all, the resistance 11 so balances the potentials that there is always available a means of drawing unbalanced current through one of the gaps.

Let us suppose that in a stationary position both gaps are drawing current, the condenser 12 will be charged to the potential of the IR drop across 11, and this will be less than the battery voltage by the amount of the drop across both gaps in parallel. If one gap suddenly becomes slightly smaller while the other gets larger by like amount, the total resistance and hence the IR drop across the gaps in parallel must become greater or less than it was, hence there is opportunity for a sudden current flow around the radio-frequency loop, since 12 will take up or lose charge by an amount specified by the change in IR drop across the gaps. The specific requirement for the production of radio frequency transients is that one gap become smaller than the other. Under these conditions, the voltage almost instantly drops to where it will not support a discharge across the longest gap; simultaneously, the discharge builds up across the short gap and a small avalanche occurs.

Figure 16:
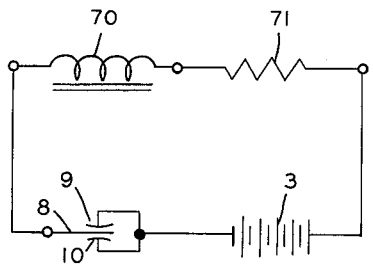
FIGURE 16 is a schematic circuit diagram of the low-frequency circuit when a choke coil is used as the ballast impedance element.

The criticism might be entered that if the gaps are adjusted sufficiently close to produce a significant response for the smallest seismic displacements, the gap plates will rattle and bang together for the largest displacements. It is a well-known fact that the magnitude of earth displacements in seismograph exploration vary in the ratio of at least 10,000 to 1. The first reflections have a very high energy while the ones arriving from deep zones are near the threshold of seismic unrest which is generally taken at about $10^{-8}$ inches displacement. This difficulty, which is a grave obstacle in the present art of seismic exploration, is of little consequence here. In the first place, if the gap plates are ground very flat and very smooth, the air between them serves as an excellent shock absorbing medium which alone practically prevents metallic contact between the plates. Secondly, once the motion away from the central balance point is sufficient to start an avalanche in one gap, it is of little consequence how much further the plates move. The radio wave registering the event will have left the antenna and arrived at the receiving point long before the gap plates have had time to bang together. At the same time, the larger displacements will, with the correct gap and circuit design, tend to produce slightly larger responses because the plates will move further before the discharge takes place. This feature can be greatly assisted by giving impedance 4 the proper characteristics. If an RC circuit is used for 4, as in FIG. 2, the time constant can be adjusted to be of the same order of magnitude as the period of the incident seismic shock. Again, an inductance may be used for element 4, as shown in FIG. 16. This would tend to hold back the current and delay the action, giving the plates more time in which to move.

Referring to FIGURES 3, 4, 5, 6, 7, 8, 9, and 10, the construction of one form of dynamic spark gap will be described in detail. As in FIG. 1, element 8 is the stationary conducting element having sufficient mass to couple it to the earth's gravitational field so that it will be able to resist the opposing elastic and electrostatic forces. It is suspended like a horizontal pendulum by means of a long flexible arm of cantilever beam 38. Beam 38 and mass 8 may be made in a single piece from one material, or an assemblage of several pieces of different materials may be used. The left hand extremity of arm 38 is clamped between insulating prisms 36, if a circuit is chosen requiring 8 to be insulated from ground potential. If 8 is grounded, then the supporting prisms may be hard metal pieces having a polished flat face and opposite it and parallel thereto a polished edge. Good materials to be used when it is required that 36 be an insulator are porcelain-like ceramics, crystalline $Al_2O_3$ (sapphire) which is now commercially available, glass of good quality, quartz, and any other types of hard insulating materials which can readily be ground flat and given a high polish.

Figure 7:
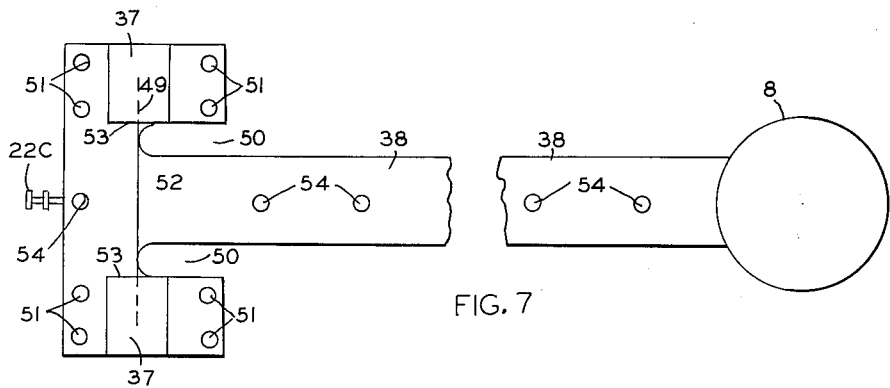
FIGURE 7 is a detail showing the construction of the cantilever pendulum of the dynamic spark gap.

As particularly shown in FIG. 7, the left-hand extremity of the supporting arm 38 is so cut away, and the remaining portions fastened between the insulating prisms 36, that the axis of flexure 49 lies in a plane which passes through the pivot points 30 of the insulating prisms. The purpose of this is to provide proper means for adjusting the separation of 8 and 9, and 8 and 10, so that the axes of adjustment are always in the same plane as the axis of relative motion. In this way, each and every portion of 8, 9 and 10 retain the same angular separation for each position.

In order to obtain optimum performance, very close gap spacings are essential. This means that the gap plates must be optically flat and move with optical precision. The latter requires that the fulcrums where the insulating prisms bear must also be precisely ground and lie exactly in the planes of the plate faces. To accomplish this end, the conducting plates 9 and 10 are fastened to their respective insulating frames, 20 and 29, before complete assembly, and these sub-assemblies ground optically flat.

Using the same type of procedure, surfaces of the central electrode and the apices of the insulating prisms while fastened to the arm 38 are likewise ground flat, and to have the same thickness apex to apex as across any portion of 8. This is done in two operations, first for one side and then for the other. To prevent the elasticity of the arm 38 from destroying the flat grinding procedure, through unwanted flexure, holes 54 are provided for temporarily fastening stiffening pieces.

Figure 10:
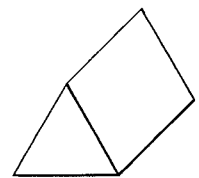
FIGURE 10 is a detail of the insulating wedge.

Other parts and their functions in this assembly are the following: Parts 13 and 26 are clamping screws by means of which the separators 46, 47 and 48 are locked in place, once the assembly has been adjusted. To assist in this end, the metallic end pieces 15, 25, 44 and 45 have slots 42 and 43 cut into the screw holes which engage the separators. Parts 16 are screws which fasten end-plates 35 to wedging blocks 18 preventing the prisims from sliding back and forth. The wedging blocks 18 have angular edges 57 so cut that the insulating prisms are not bound on their faces but bear only on their apices. At the same time, the angular extremities of the wedging block make grooves for the apices of the wedging blocks. A detail of the wedging block is shown in FIG. 8, and a detail of the insulating prisms is shown in FIG. 10. 22A, 22B, and 22C are terminal lugs by means of which electrical connections can be made to the plates of the gaps. Parts 27 and 32 are the knurled knobs of the separating screws. Parts 33 are wedging blocks, with acute faces, by means of which the insulating prisms are fastened to the arm 39, using screws 34. 37 is a recess in the arm into which the insulating prisms also fit and where springs 58 can be located if desired.

In all of my experiments thus far, the dynamic gap was operated in air at atmospheric pressure, and this gave satisfactory results. When it is found necessary, certain improvements can be made by operating the gap in other gases than air and at other pressures than atmospheric. This can be accomplished by enclosing the dynamic gap or gaps in a suitable vessel, exhausting the air by means of well-known vacuum technics and admitting the desired amount of a selected gas or combination of gases into the vessel. Procedures for doing all of these things have been well established and won't be further reviewed here.

It is known that all gases are in some state of ionization unless very extraordinary measures are taken to prevent ionization taking place. It is this ionization which is responsible for the conduction of electricity through gases. Ionization of a gas is brought about by the gas atoms or molecules receiving sufficient energy from an external source to cause one or more electrons to escape from the outer orbits of the atom. The external source of energy is usually an incident particle or quantum of radiation. There are at least nine ways in which electrons may be injected into a gas to produce its ionization, as listed in my copending patent application, above referenced, and not here repeated to save space.

One or all of these emission effects may act as the initiating agency of a high state of ionization in the gas of the gap; and in building up the discharge to a high level, many of these effects do undoubtedly enter the process at one time or another.

Figures 11, 12:
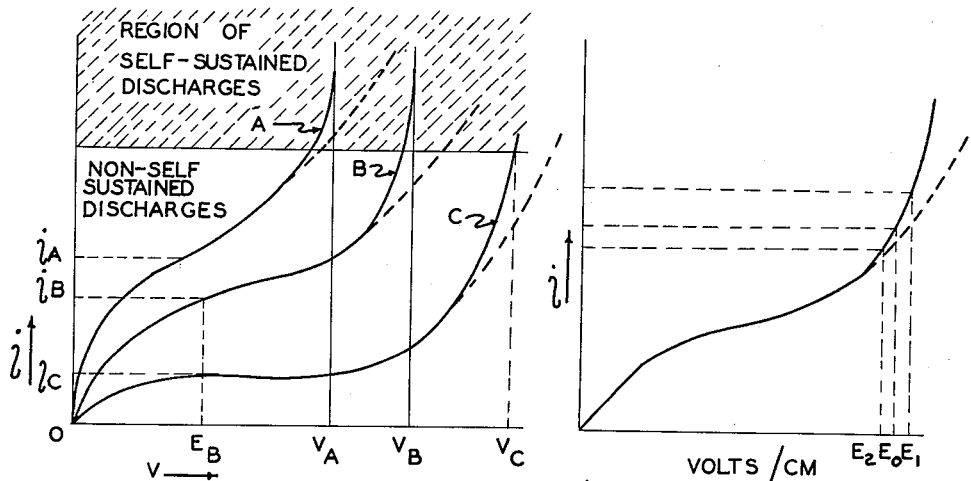
FIGURE 11 is a graph of current vs. voltage in an electric discharge through a gas, with strength of the initiating ionization agency as parameter.
FIGURE 12 is a graph of current vs. potential gradient in an electric discharge through a gas.

For a particular gas and metal electrodes, at a given separation, the curves of FIG. 11 show graphically the process of ionic conduction through the gas. As shown, it is customary to divide the discharges into two general types, those which are self-sustaining and those which are not self-sustaining. The mechanism of break-down of a gas in a transition from the non-self-sustaining region (the dark discharge) to the self-sustaining region (the glow, spark or arc). This is brought about by a sudden build up of the ions from all sources as they gather energy while moving under the influence of the applied electric field. Often this build-up and subsequent discharge occurs with explosive violence.

The three curves of FIG. 11 are for three different strengths of initiating agent—for example, three different amounts of $\gamma$-rays. Curve A is for a relatively large irradiation by $\gamma$-rays; curve B is for an intermediate value; and curve C is for a relatively small amount of $\gamma$-radiation. As the voltage is first applied, the conduction in the gas starts out slowly for all three curves, and in this first region obeys Ohm's law. Then as the applied field is increased, all of the ions produced by the ionizing agency tend to be removed; yet the field is still so low that the ions do not gather sufficient energy to produce additional ions by bombardment; and the so-called saturation region is reached in which increases is applied voltage do not cause appreciable increases in current. Curve C has a well-defined saturation region; curve B a less well-defined region; and Curve A scarcely has a true saturation region at all. Such curves are typical for a gas, and while all the regions described exist for each curve, the regions over-lap to a considerable extent and often aren't well-defined.

Beyond the saturation regions for each of the curves, as at $V_A$, $V_B$, and $V_C$, the current through the gas increases exponentially and soon builds up to a high value. This rapid build-up of current in this region of non-self-sustained discharges is often called an electron avalanche, and this term has been used earlier in the present disclosure.

If the applied voltage is raised still further, a self-sustained discharge or spark occurs. Whether the discharge is continuous depends upon the ability of the electric field producing agent to supply the necessary energy. If the ability is sufficient the discharge will be continuous as in a welding arc; if insufficient, one or more sparks will deplete the energy to the point where a discharge is not supported, and the current drops to zero. This is the quenching process already referred to.

FIGURE 12 shows a graph similar to those of FIG. 11, except the current through the gap is plotted as a function of the field strength across the gap, in volts per unit distance. Let E be the operating point of the differential gaps when the electrodes (gap plates) are adjusted to give equal capacities between the central electrode and the electrodes on either side. This operating point is set on the steep portion of the curves as it moves into the self-sustained region, and preferably just below the point where the electron avalanche will carry the current quickly into the sparking or self-sustained region; i.e., at the point where the current increases more rapidly than given by a simple exponential.

As an incident seismic wave impinges on the geophone the outside plates move relatively to the central plate, the field intensity across one gap is raised to $E_1$, while that across the other gap is lowered to $E_2$. The field intensity $E_1$ is sufficiently far toward the self-sustaining region that an electron avalanche occurs and the discharge may move into the self-sustaining area. But it is not essential, although it may be desirable, that the discharge be self-sustained for a radio-frequency transient to be produced in the associated circuit. The minimum requirement is that an operating point be chosen on the steep portion of the curve in the region of the electron avalanche so that the change in current takes place sufficiently rapidly to energize the radio-frequency circuit. This means that a relatively large current should occur in a fraction of a half-period of the electric oscillation produced.

Figure 13:
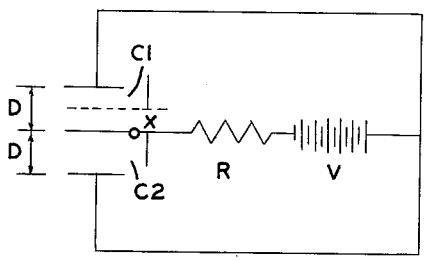
FIGURE 13 is a simplified schematic diagram used in explaining the operation of a dynamic spark gap.

FIGURE 13 shows an electrostatic portion of the circuit under conditions just discussed. Initially the central plate is at the equilibrium position half-way between the two outer plates. The two capacities are then equal, $C_1 = C_2 = C_0$. As the upper plate moves toward the central plate, $C_1$ increases and $C_2$ decreases. If $d$ is the initial separation of the gap plates, $x$ the amplitude of the motion, A the effective area of each plate including dielectric constant and other dimensional constants, $Q_1$ and $Q_2$ the respective charges on the condenser plates, and V the battery E.M.F., we can write $$C_1 = \frac{A}{d-x} = \frac{Q_1}{V} \\ C_2 = \frac{A}{d+x} = \frac{Q_2}{V} \quad (1)$$

Since the current which flows initially is inappreciable, the drop across the resistance R need not be considered at this point in the analysis. Rewriting Equations 1 is slightly rearranged form, we have $$C_1(d-x) = A = \frac{Q_1}{V/(d-x)} = Q_1/E_1 \\ C_2(d+x) = A = \frac{Q_2}{V/(d+x)} = Q_2/E_2 \quad (2)$$

from this we can get $$Q_1/Q_2 = E_1/E_2 \quad (3)$$

It is seen that since the total potential across each gap is fixed by the battery, the charges on the respective gap plates must change in proportion to the changes in electric field intensity. This must mean that some of the charges on the central plate scurry from one side to the other side while the charges on the outer plates rearrange themselves by flowing through the radio-frequency coil which is an electrostatic short circuit. Of course some extra charge will be supplied by the battery because the parallel capacity, $C_1 + C_2$ is not constant, although the series capacity composed of $$\frac{C_1 C_2}{C_1 + C_2}$$

is constant throughout the motion.

This readjustment of charges continues as the electron avalanche builds up and eventually results in the spark discharge, as already described. When the current across a gap reaches a sufficient magnitude, an electrostatic analysis is no longer sufficient and the process must be considered from a dynamical point-of-view. Since a complete discharge takes place in only one gap at a time abundant descriptions of the process may be found in the literature.

It is clear that the materials from which the outer surfaces of the gap plates are made may be very important, and while I have found ordinary materials such as aluminum, copper, silver to be adequate in all of my experiments, my invention shall not be construed as being limited to one material more than another. Similarly, while in my experiments I have found ordinary air to be sufficient as the gas in the gap subsequent study and experimentation will, undoubtedly, uncover gaseous dielectrics which are better. Realizing the possibility of using any and all gaseous elements, compounds and mixtures, my invention is not limited to one gas more than to another. Indeed, I recognize even the possibility of using certain liquids in the gap.

While there are ever-present sufficient ionizing agents, it is clear from the curves of FIGURES 11 and 12 that the process may be quickened, supplemented, and intensified by the addition of a more potent ionizing agent. Accordingly, I propose placing in the vicinity of the gaps a capsule containing radioactive material. Or such material may be contained in or as a coating on the gap plates in the form of an impurity. Or again, radioactive impurities of gaseous form may be contained in the gas itself.

Figure 21:
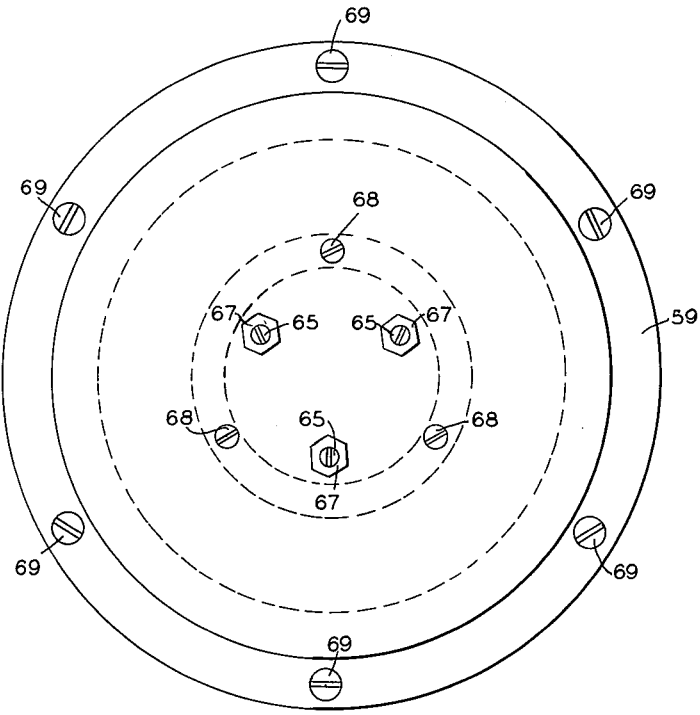
FIGURE 21 is a plan view of an alternative form of dynamic spark gap.
Figure 22:
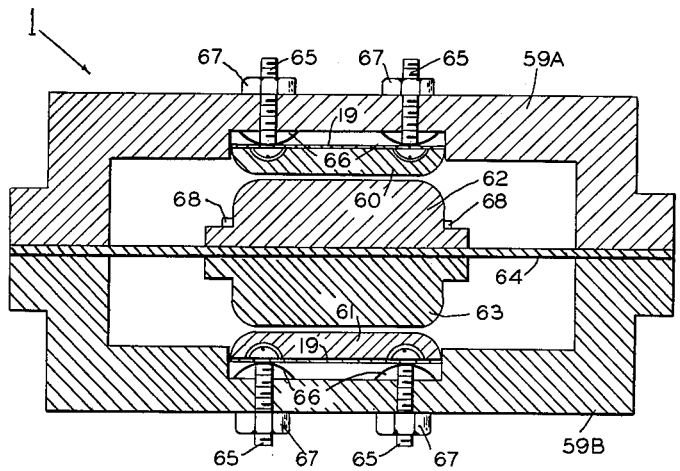
FIGURE 22 is an elevation in section through the center of the structure of FIGURE 21.

A second form which the dynamic spark gap may take is shown in FIGURES 21 and 22. In this structure, the central electrodes, plates 62 and 63 are mounted on a diaphram 64, the latter being supported between two insulating cylindrical half-shells 59$_A$ and 59$_B$. Also supported by the insulating half-shells are the external gap plates 60 and 61. These plates are aligned axially with the internal plates 62 and 63 and each pair of opposing plate faces are parallel to each other. In construction, all plates are ground optically flat. Three screws 65 are then used in conjunction with cup springs 66 to mount the external gap plates to the insulating half-shells, the mounting holes in the half-shells being threaded. These screws have sockets in the external electrodes 60 and 61 and are held thereto by means of plates 19 so that positioning and leveling of the external plates may be readily accomplished. Plates 19 are, in turn, fastened to electrodes 60 and 61 by means of screws (not shown) or some other suitable fastening arrangement. Locking nuts 67 are then used to fix these positions. Three screws are used for each plate 60, 61, because three points determine a plane.

This dynamic gap may be used in the same circuit as the structure already disclosed, namely the circuit of FIG. 1. In conjunction with this circuit, or a similar one, it forms a true radio geophone. This structure has the advantage of being more compact, readily adjustable and economic to manufacture.

As before, it is proposed to use many different types of electrode surfaces, gaseous dielectrics, and if necessary, to include radioactive material to act as ionizing agents.

FIGURE 16 shows schematically the low-frequency circuit when a large inductance 70 is used as element 4 in FIG. 1. In this circuit 71 is the resistance of the choke coil 70, including any additional resistance that may be added. 8 is the internal, and 9 and 10 are the external gap plates, as before; also 3 is the storage battery as previously noted. It is seen in this low-frequency circuit the gap plates form two capacities which act in parallel. The inductance 70 acting in conjunction with the capacity 9, 10 and the resistance 71, may have such a value as to give this low frequency circuit any desired response. For example, it may have such a value as to resonate with the initial capacity of 9, 10 at the frequency of the fundamental component of the mechanical motion. This will tend to build-up the low-frequency voltage across the condenser before discharge takes place, and to retard the radio-frequency discharge.

FIGURE 17 shows a single-ended form of radio-geophone circuit which is useful in many applications. 72 is the dynamic single-ended spark gap which may take the mechanical form of essentially half of any of the double spark gap structures, such, for example, as half of FIGURES 3, 22, 23, 24, 25 and 27. Again, the external plates may be connected together to form effectively one spark gap element while the internal plate serves as the other. 73 is the buffer resistance, 74 the battery, 75 and 76 the primary and secondary, respectively, of the radio frequency circuit, 77 a variable capacity used to tune 76, 75 being tuned by 72. 79 is the antenna and 78 is the condenser by-passing the battery 74 and resistor 73. As element 73, a low-frequency and/or a high frequency choke coil may also be used.

Figure 18:
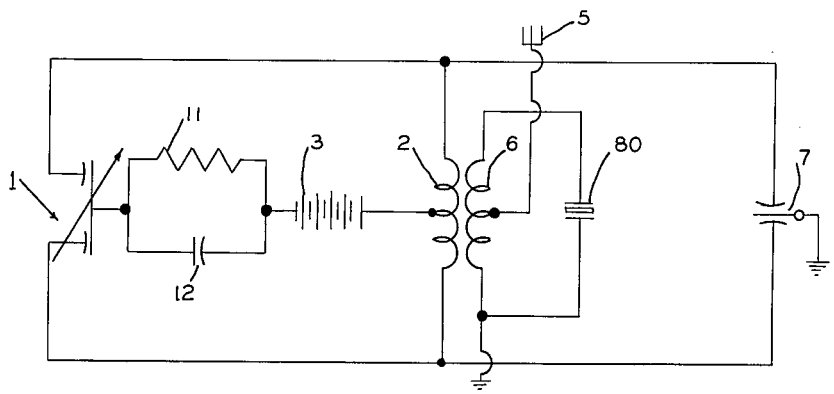
FIGURE 18 is a schematic circuit diagram of a crystal-controlled radio geophone circuit.

FIGURE 18 shows the circuit of FIG. 1 incorporating a piezo-electric frequency control crystal 80 in the secondary. Alternatively, the crystal may also be placed in the primary in the position of condenser 7. This circuit also shows the antenna coupled to the secondary in a slightly different manner.

Figure 19:
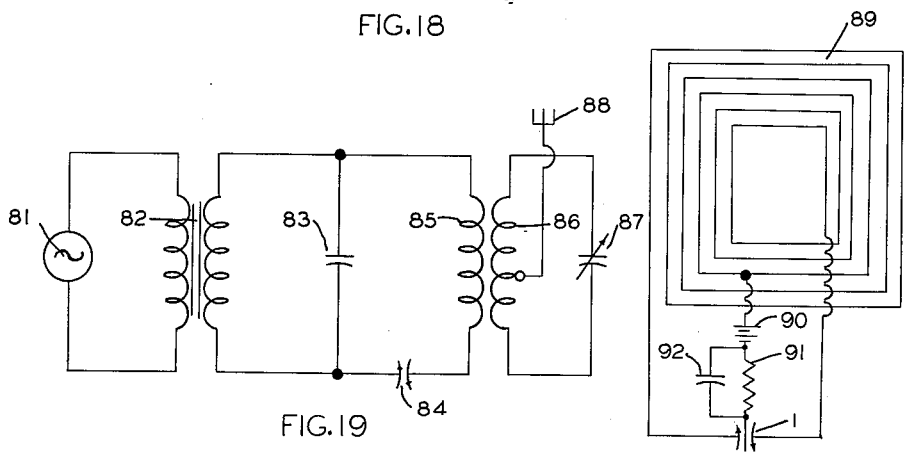
FIGURE 19 is a schematic circuit diagram of still another form of radio geophone circuit which makes use of a dynamic spark gap.

FIGURE 19 shows a dynamic spark gap 84 in a typical spark-coil transmitting circuit. 81 is the low-frequency generator, 82 is a step-up high voltage transformer which at or near the peaks of the low-frequency cycles produces sufficient voltage to break gap 84 down, thus discharging condenser 83 through radio frequency inductance 85, 83 having been charged earlier in the low-frequency cycle. In this way, a radio frequency transient of considerable energy may be formed; a portion of this energy is absorbed by the secondary coil 86, which is coupled to 85 and tuned by 87, and radiated into space by antenna 88. As the plates of the dynamic gap move relatively to each other, the gap gets shorter or longer, as the case may be, and at a given voltage from the generator 81, breaks down earlier or later in the low-frequency cycle. At the receiving end, a synchronous detector is used to demodulate the signal, the unaltered low-frequency decremented signal having been transmitted by a second circuit which has a fixed spark gap. Or, alternatively, the differential spark gap may be used to transmit simultaneously two radio-frequency transients, one of which is advanced in time by the short gap, the other of which is retarded in time by the long gap. These two signals may then be compared in a synchronous detector. Or they may be picked up by the same receiver and the beat note between the two amplified and then detected. Many possibilities exist for this circuit.

Figure 20:
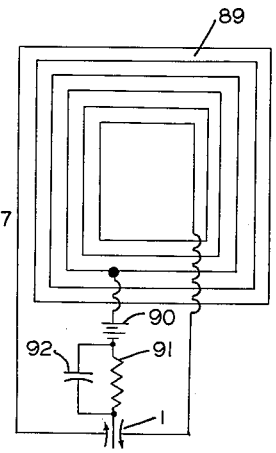
FIGURE 20 is a schematic circuit diagram of a radio geophone which uses a large inductance loop as both antenna and tank inductance.

FIGURE 20 shows schematically a circuit of the form of FIG. 1. The essential difference is that the primary coil in the form of a large loop 89 also forms the radiating circuit. Such an arrangement at low radio frequencies does away with the need for a long antenna and so greatly assists in forming a compact unit. At the same time, the loop radiator is directional and this fact may be used to advantage in peaking the energy in the desired direction.

In accordance with Paschen's law, and as is well-known, the sparking potential $V_s$ is given by the relation $$V_s = \frac{BPd}{\ln\frac{APd}{\ln 1/\gamma}} \qquad (4)$$

where A and B are constants for a particular gas, P is the gaseous pressure, $d$ is the distance between plates or electrodes; i.e., the gap distance, and $\gamma$ is the second Townsend coefficient; i.e., the number of additional electrons freed at the cathode per positive ion bombardment of this cathode. It is seen that the sparking potential is a function of the product of gap length alone, and this, and the other physical facts shown in Equation 4 are important to this invention. It is clear that the moment of sparking is controlled by the constants A and B for the gas (i.e., the physical properties of the gas), the applied electric field $V_s$, the gap length $d$ and the pressure of the gas P. All of these conditions have to be met in such a relation as (12). If they are so met, then the spark will occur; if they aren't met a spark won't be produced. Thus, the dynamic spark gap may be constructed to be wholly a reliable device, and while the variation of gap spacing is of primary concern, the other factors may be applied to obtain or assist in controlling the operation.

Figure 14:
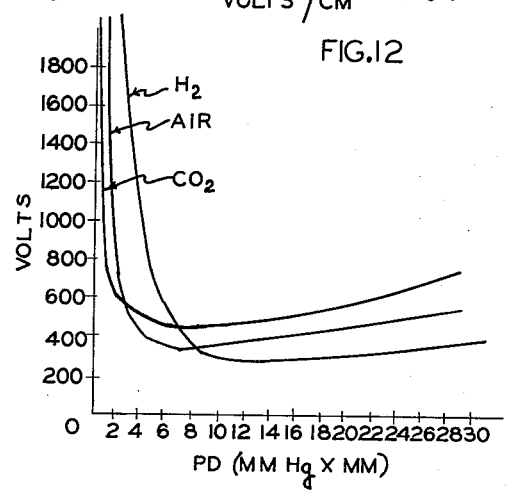
FIGURE 14 is a graph of the product of gas pressure and gap spacing vs. voltage for breakdown.
Figure 15:
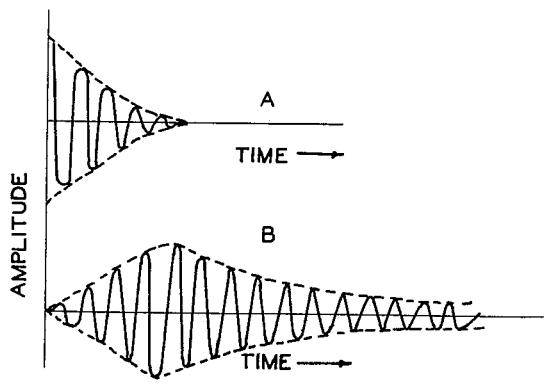
FIGURE 15 is a graph of some of the radio-frequency transients produced in the circuit by a gas discharge.

One thing of importance which immediately comes out of the foregoing relations is that the sparking voltage has a minimum value at a critical value of $Pd$. Perhaps this is best shown by FIG. 14. From this figure, the following table of sparking potential and gap spacings for air at atmospheric pressure may be obtained.

*Sparking potential of air, at atmospheric pressure, in the vicinity of the minimum*

| Sparking Potential, Volts | Gap Spacing | |
| --- | --- | --- |
| | mm. | inches |
| 700 | .0036 | .00014 |
| 400 | .0063 | .000245 |
| 390 | .0071 | .00028 |
| 380 | .0108 | .00042 |
| 390 | .0180 | .0007 |
| 400 | .0231 | .00091 |
| 420 | .0288 | .00112 |

It is clear that for best results, at low voltages, the operating point of the dynamic gap should be right of the minimum a considerable distance. This means that if one is working with gap spacings of the order of .0001 inch or less, it will be necessary to maintain the gas in the gap at 25 or 30 atmospheres if moderate voltages are used.

The relation (4) also shows that it is immaterial whether the gap spacing, pressure, or both, are changed to initiate the discharge. In my radio geophone wherein large flat gap plates are used at very close spacings, both the gas pressure and the gap spacing tend to change simultaneously, but in a compensating direction. This is due to the fact, that at the moment of impact, the air is semi-confined and so is compressed by the plate motion. This means that for best results, the natural periods of the gap plates should be less than the relaxation time of the compressed gas so that the gas has a certain opportunity to break down. Or it might turn out that break-down in the differential gap actually occurs in the gap for which the spacing is increasing.

Be these conditions as they may, the break-down characteristic is essentially logarithmic, while the P$d$ compensation, afore described, will be essentially linear; consequently, an opportunity is always had for break-down.

If one operates the gap with fairly high voltages, it may be possible to operate left of the minimum break-down voltage, FIG. 14. Particularly would this be true if some agent other than gap width is controlling the operation, as in the structure of FIG. 25. In this region, left of the minimum, there is a rapid change of break-down voltage for a small change of P$d$ in a direction of negative slope. Thus, if the biasing voltage is constant, P$d$ must increase to cause break-down, so that breakdown would occur definitely when a gap was opening. The difficulty here, however, is that break-down paths are not necessarily confined to the shortest distances, hence the requirement for the controlling agent being other than gap spacing. For a given gap spacing, in this region, a break-down path of the right length and voltage gradient could invariably be found at least around the edges. Thus, the device would tend to be unstable in this region, unless control was maintained by other means.

One of the problems in exploration seismology, earlier mentioned, is that of the enormous range in amplitudes covered by the waves incident on the geophone—something like 10,000 or 20,000 to 1. The ground roll and sometimes also the first reflections produce displacements at the geophone of the order of $10^{-3}$ to $10^{-4}$ inches. While the smallest displacements which must produce recordable signals are of the order of $10^{-7}$ to $10^{-8}$ inches. It was pointed out that the gas between the dynamic gap plates tends to furnish a natural AVC action due to its tendency to become incompressible in a confined space. It was also stated that the nature of the spark gap discharge is such that it doesn't particularly matter what happens after the seismic impulse has been transmitted. At the same time it may be desirable in some situations to be able to provide automatic displacement compensation (ADC) in the dynamic spark gap. This can readily be done with the mechanism of FIG. 23. The external gap plates 173 and 174 are attached to two hinged arms 171 and 172 by means of insulators 169 and 189.

The hinge 170 is attached to the supporting frame member 148, of any particular size and shape that may be desirable, and the internal gap plate 175 is also fixed to 148 at the hinge point so that it will tend to vibrate about the hinge axis. The two arms 171 and 172 are fastened together on the open end by means of right-hand threaded shaft 177, left-hand threaded shaft 178, worm gear 176, and gimbals 179 and 180, threaded to match the shafts which work into them. 181 is a worm attached to a motor or clock mechanism 183 by means of shaft 182. If an electric motor is used, it will be energized by a battery 186 through reversing switch 185 and a relay 184. The relay coil 187 can, in turn, be connected, via terminals 188A and 188B, in the center leg of the radio geophone circuit; i.e., as part of impedance element 4. Or it may be connected to a geophone of the magnetic type. In this way, the first strong seismic waves received close the relay 184 and this starts the motor 183 in such a direction as to bring plates 173 and 174 closer together so that the gap spacing will be made continually smaller, at a predetermined rate, as the incoming seismic signals get weaker. The relay 184 is of the self-locking type, or is given a sufficient time constant that it will stay closed several seconds after first closing upon reception of the first strong seismic impulse.

Alternatively, the relay coil 187 may be connected to a receiver and orperated remotely. In these several ways, the gap may be made to have an appropriate spacing throughout the interval of the seismic record.

Again, 183 may be any suitable clock mechanism which can be accurately pre-set, or which can be started by a relay or incident shock. In the former case, all geophones can have their clocks adjusted to keep accurately the same time. These clocks can be pre-set with the gap plates at a fairly wide spacing; then at some future time, the gap spacings will be right to receive the seismic pulses and transmit the radio waves. This is possible because of the extremely small gap spacings wanted during the interval of transmission. For example, the gap should change from about $10^{-3}$ to $10^{-7}$ inches in five seconds, or thereabouts. This is at a linear rate of $10^{-3/5} = .0002$ inch a second, to a very close approximation. Thus, if the clocks are pre-set to a half-hour in advance of the time of the seismic explosion, the initial gap spacing would have to be only 0.36 inch.

FIGURE 24 shows an alternative form of radio geophone dynamic gap. It was shown in the theoretical discussion that it is immaterial whether the gap spacing or gas pressure is varied, or both. The present structure is one in which the gaps 199 and 200 are fixed but the gas pressure is caused to vary by an incident displacement. The structure shown is of an involuted form so arranged to provide a differential action, the pressure at one gap being at a crest value while that at the other is in a trough. Of course, one or other of the gaps may be used separately if differential action is not desired.

As illustrated, the device has two gas-filled chambers 211 and 212 of approximately the same volumetric dimensions, and in these the gaps are located. The walled portions 190, 191, 192, and 193 provide the enclosures for the chambers as shown. 194 is a piston of appropriate mass resting on a spring 195. When a seismic wave displaces the vessel relatively to the piston, say by moving downward, the liquid in the upper and outer chamber 196 is momentarily contracted into a larger space so that the gas pressure in 211 is momentarily decreased. If the gap spacing of 199 and the voltage applied to it have appropriate values, the gap will suddenly become very conducting and discharge through the radio frequency circuit, such as that of FIG. 1. At the same time, the liquid in the inner chamber 197 will be compressed slightly, the gas pressure in 212 will raise and gap 200 will not discharge. Conversely, as the piston falls, on the second part of the seismic cycle, the compressions, and rarefactions in the respective chambers will be reversed and gap 200 will discharge while 199 doesn't—thus providing the differential action sought when one pair of gap terminals, say 208 and 210, are connected in parallel while the other pair of terminals 207 and 209 are connected to the primary coil of the radio-frequency circuit, as in FIG. 1.

There being no dearth of seismic energy, a piston having a large cross-section may be used, while the gaps may be placed in tubes of very small cross-section. In this way, a great amplification may be obtained. For example, if the gaps are in tubes ¼ inch in diameter, while the piston occupies a chamber 4 inches in diameter, the amplification neglecting total gas volume will be 1024. At the same time, a device of such dimensions is not overly bulky, and it has a very simple construction. The effect of total gas volume in materially decreasing the above amplification is neglected because it is believed that pressure waves will be sent through the gas filled tubes rather than that the whole gas volume will be instantly compressed or rarified. If this is true, then very large amplifications can be had since ¼ is probably not the lower limit to the diameter for the gas filled tubes.

A somewhat less efficient pressure sensitive radio geophone may be made by eliminating the liquid from the device of FIG. 24 and making the piston sufficient thick that very little gas volume exists in the portions of the chamber having a large cross-section. In this way, as before, a small displacement over a large area may be converted into a larger displacement over a smaller area. But here again, the phenomena of pressure waves may be the primary consideration so that volumetric considerations are less important.

If the sudden displacement of the piston, relative to the gas, causes pressure waves to be produced in the gas for the most part, then it might be more effective to use a piston having a concave spherical or parabolic face with the gaps located at the foci of these faces. Particularly would this be true if the gas used in the chamber was very dense, for example krypton or xenon at a hundred or more atmospheres pressure. Sound velocity under these circumstances would be sufficiently great that a reasonably-sized piston might have a diameter of an appreciable fraction of a wave length.

Again, the entire chamber space could be filled with a suitable liquid.

FIGURE 25 illustrates schematically a dynamic spark gap arrangement in which an incident ionizing radiation is the active agent in determining the time of spark break-down. The gas-filled chamber 221 is located inside a block of dense matter 220 which substantially shields it from all sources of energy which would cause its ionization. For this purpose the materials out of which the chamber walls, as well as the gas itself, must be exceptionally free from radioactive contaminants which would ionize the gas. Under these conditions it is possible to operate the gap in a suspended or retarded condition so that an unwanted discharge brought on by contaminants, which it is impossible to completely remove, occurs only once every few minutes. The action of delayed spark gaps has of course been observed, and the failure of having sufficient ionizing agencies present made some early observations on gas discharges worthless.

Connecting the chamber 221 with the outside is a long narrow canal or corridor or tube 223, perhaps a mill or two wide. This canal is closed by means of a relatively thin plug 239 so that the gas on the inside may be maintained at a pressure other than atmospheric, if such is desirable, and also so that the purity of the gas may be maintained. Directly opposite the corridor and in accurate alignment therewith is a long-thin, dense lamination 224 which is just sufficiently thick to completely block the corridor from external radiations when in the neutral position. This lamination is mounted on a piston 230, the latter being supported in a cylinder block 227 and resting on a spring 229. This spring is held in position within the cylinder block by a threaded plug 228 whose position up-and-down may be accurately determined by rotation so that the initial position of the lamination may be accurately set. Above the lamination 224 the shaft extends, as 231, to support any additional weight 232 which it might be desirable to use, as well as to place the same amount of material in the radiation path above and below the lamination. Slots 240 may be cut in the piston walls directly above and below the lamination as shown by the dotted line, so that the radiation path is not unnecessarily impeded above and below the lamination.

To the left of the lamination and in perfect axial alignment with it and the canal to the chamber is a radiation source 225, also appropriately shielded by means of the dense housing 226. The latter is supported on a pedestal 234 from the same platform 233 which supports cylinder block 227 and the chamber housing and shield 220. Thus, when seismic waves are incident on this assemblage, as when it is in mechanical contact with a seismically disturbed earth, the radiation source 225 and chamber 221 move relatively with respect to the lamination 224, the latter being held momentarily by gravity. As a consequence, a thin pencil of rays from 225 can pass above or below the lamination 224 through canal 223 and into chamber 221. If these rays are strong, they will instantly ionize the chamber gas and cause a discharge across gap 222, it being assumed that the latter is connected in a circuit such as that of FIG. 17 by means of the terminals 237 and 238 which pass into the chamber by means of insulating sleeves 235 and 236. While for convenience the insulating sleeves and inter-connecting wires are shown passing along a straight line path into the chamber, it would be far more efficient to have them take a curved path so that radiation, which follows straight line paths, could not readily leak into the chamber by following the insulating sleeves.

Obviously, lamination 224 may be initially adjusted to either close canal 223 in the rest position, or leave it open. If the canal is open in the rest position, a seismic signal causing the relative movement of lamination 224 with respect to canal 223 acts to close the canal, quench the spark discharge, and suppress the radio frequency signal. Accordingly, it is possible to provide push-pull or differential operation by having two devices, as shown in FIG. 25, operating side-by-side, with one lamination adjusted to initially close the canal with which it cooperates while the other lamination is initially adjusted to leave the canal with which it cooperates open. The four electrodes of this combination are connected in the circuit of FIG. 1, with one electrode from each gap connected to the ballast impedance 4, and the remaining electrodes connected to the primary terminals of the radio frequency transformer. Again, it is clear that the body 220 may contain two isolated cavities, two sets of electrode plates, with one set in each cavity, two separated canals, with one canal slightly below the other. In this way, with this arrangement, one lamination and one radiation source may serve both canals, the initial position of the lamination being that of covering one canal, and the disposition to move under the influence of incident elastic waves relatively to the canals being that of opening the initially-covered canal and closing the initially-opened canal, to provide a push-pull or differential dynamic gap arrangement.

Figure 26:
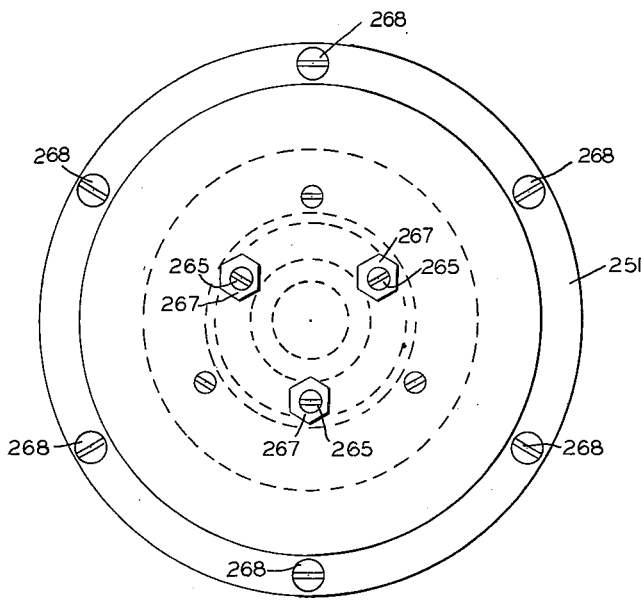
FIGURE 26 is a plan view of still another form of dynamic spark gap.
Figure 27:
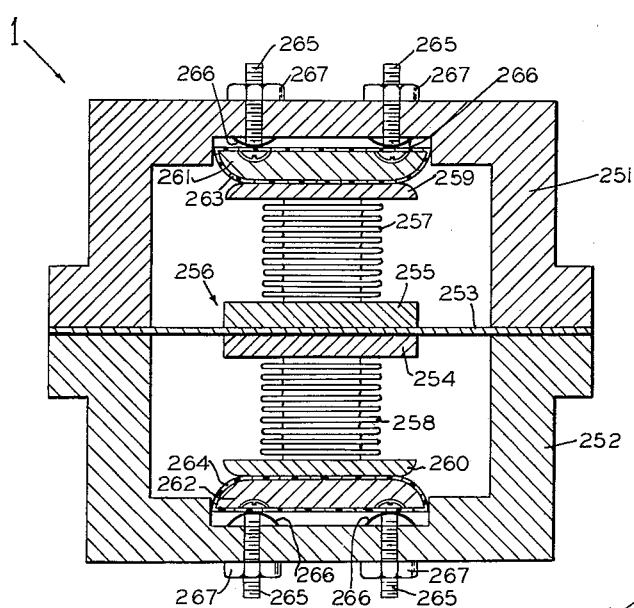
FIGURE 27 is an elevation in partial section through the center of the structure of FIGURE 26.

FIGURES 26 and 27 illustrate a different type of dynamic spark gap geophone, yet one which is quite similar in mechanical structure to the dynamic spark gap geophone of FIGURES 21 and 22. In the latter, the device is typically operative to produce a signal when one of the differential gap spacings becomes smaller than the other. The opposite is generally true of the structure of FIGURES 26 and 27 which becomes typically operative to produce a signal when one of the differential gap spacings gets larger than the other.

Considering FIGURES 26 and 27 in detail, 251 and 252 are two generally similar cup-like insulating members having circular cross-sections which are fastened together by means of flanged portions and screws 268. Between these flanged portions of 251 and 252, a diaphragm 253 is clamped. A weight 256, consisting of two generally equal halves 254 and 255, is fastened to and axially aligned with the diaphragm 253. One end of each of two essentially cylindrical bellows, 257 and 258, is axially aligned with and fastened to the weight pieces 254 and 255, respectively, and the other ends of the bellows are fastened to electrode plates 259 and 260, respectively. The plates 259 and 260 thus effectively form the central plate of the differential gap structure. The other gap plates, or electrodes, are 261 and 262 and each of these have very thin insulating coats 263 and 264, respectively. Alternatively, the gap plates 259 and 260 may have insulating coats, 263 and 264 being uninsulated. Or all four gap plates may have their insulating coats, as may be found desirable.

As before, the same precautions are taken to make all of the gap electrodes exceptionally flat, and the outside electrodes 261 and 262 are adjusted into parallel alignment with electrodes 259 and 260, respectively, by means of leveling screws 265. Cup springs 266 and locking nuts 267 are also provided with each leveling screw, as shown.

In the rest position, the leveling screws are adjusted to place the cofacing electrode plates into physical contact with each other. Metallic electrical contact is prevented by the thin insulating layers 263 and 264.

The properties of the insulating layers 263 and 264, in addition to being insulators, are the following: They are slightly compressible and have a multiplicity of holes or imperfections. Thus, when the pairs of electrode plates 259, 251 and 260, 262 are placed together and a suitable potential difference established between them, a multiplicity of little sparks will pass between the paired plates via the holes or imperfections in the insulating layers 263 and 264. Consequently, if the pairs of plates 259, 261 and 260, 262 are placed in the circuit of FIGURE 1, or a similar circuit, currents will pass from the electrode plates through coil 2, battery 3 and ballast impedance 4. As has been previously explained, if the electrical gaps are adjusted to be equal, as by making the currents which flow through the gaps equal, through the adjustment of the plates, the radio-frequency energy radiated by antenna 5 will be a minimum. Such an adjustment is considered the rest position for the geophone. On the other hand, if the structure of FIGURES 26 and 27 is in contact with a seismically-disturbed earth, the weight 256 will move relatively to the remaining parts of the structure, and the pressure exerted by plates 259 and 260 on plates 261 and 262, respectively, will vary; consequently, since insulating layers 263 and 264 are compressible, the effective overall gap spacings will vary and with them the currents flowing through the gaps. As a result, the radio-frequency energy radiated by antenna 5 will vary periodically, and the radiation will become a measure of the earth disturbances.

In the preferred form of radio geophone of the type illustrated by FIGURES 26 and 27, the insulating layers 263 and 264 are very thin and the electrode plate separations of the same order of magnitude as the amplitudes of the disturbed earth, for example $10^{-4}$ to $10^{-8}$ inches. Anodized aluminum plates satisfy this requirement; likewise, an anodized surface has a multiplicity of holes or imperfections, particularly, near the crystal boundaries of the metal. Again, in terms of the gap spacings being considered, practically all materials are compressible and it matters not whether the aluminum oxide layer compresses or whether the adjacent pure aluminum layers compress. The plate which is anodized will naturally have, or can be etched to have, a hill-and-dale microscopic structure so that as the pressure between the paired plates increases, the hills will be slightly decreased in height, and since the holes or imperfections will generally be in the dales, the overall gap spacing is decreased under this circumstance. Alternatively, when the pressure decreases, the hills will rebound to normal height and the overall gap spacing will increase. I also propose using little dots of Teflon or rubber between the plates to serve as compressible cushions so that the effective gap spacings will vary as the pressure against the plates varies.

With this type of radio geophone structure, there are hundreds, and perhaps thousands of little leakage breakdown paths between each pair of electrode plates, each one of which is damped by its particular environment and by ballast impedance 4. Thus, what happens as the pressure on the plates changes differentially is that the number of little leakage paths vary, and hence the gap current, and a signal is generated in the radio-frequency circuit and radiated from the antenna.

I claim:

1. A differential transducer comprised of a divided spark gap having at least one movable element in circuit arrangement with a radio-frequency circuit, a source of electric power and an antenna, said movable element being responsive to frequencies other than those to which said radio-frequency circuit and antenna are responsive, said movable element being actuated by elastic waves, said transducer producing and radiating damped electromagnetic waves.

2. In a spark transmitter of damped electromagnetic waves having circuit means including a radio frequency resonant network, an antenna and a source of primary power, said radio frequency resonant network and antenna responsive to damped electromagnetic waves, a spark gap device comprising at least three insulated spaced apart electrodes in close geometric alignment, a gaseous atmosphere between and around said electrodes, a sensitive vibratory means responsive to elastic waves impinging thereon, said damped electromagnetic waves and said elastic waves having different frequencies, further means including said gaseous atmosphere responsive to the vibrations of said vibratory means to initiate a variable arc discharge between said electrodes, said discharge being varied in accordance with the vibrations of said vibratory means and said elastic waves and connections between said electrodes and said circuit means.

3. In a spark transmitter of damped electromagnetic waves, as in claim 2, said vibratory means comprised of a mass suspended at one extremity of a flexible cantilever beam, the other extremity of said cantilever beam being clamped between prisms fastened to a rigid framework supporting some of said electrodes in the proximity of said mass, said further means being comprised of other of said electrodes fastened to and supported from said mass, said electrodes being conductively connected to said circuit means.

4. In a spark transmitter of damped electromagnetic waves, as in claim 3, said mass and the electrodes of said further means being combined into a single metallic piece.

5. In a spark transmitter of damped electromagnetic waves, as in claim 3, said prisms being made from insulating material.

6. In a spark transmitter of damped electromagnetic waves, as in claim 3, said rigid framework supporting two electrodes in the proximity of said mass and on opposite sides of said mass, said electrodes of said spark gap device being differentially connected to said circuit means, said radio frequency network being a balanced push-pull structure.

7. In a spark transmitter of damped electromagnetic waves, as in claim 3, said rigid framework supporting two electrodes in the proximity of said mass and on opposite sides of said mass, said mass supported electrodes in the rest position being centrally located between said framework supported electrodes and in parallel alignment therewith, said radio frequency resonant network being comprised of a radio frequency transformer having mutually coupled primary and secondary windings, said primary winding having a center tap, said circuit means having in addition a ballast impedance, said frame supported electrodes being connected across said primary winding, said mass supported electrodes being commonly connected to one terminal of said ballast impedance, the other terminal of said ballast impedance being connected to one terminal of said source of primary power, the second terminal of the latter being connected to said center tap of said primary winding, said antenna being connected to said secondary winding.

8. In a spark transmitter, as in claim 7, said ballast impedance being comprised of a resistance shunted by a condenser.

9. In a spark transmitter, as in claim 7, said ballast impedance being comprised on an inductance.

10. In a spark transmitter, as in claim 7, said primary winding and frame supported electrodes being shunted by a variable tuning condenser.

11. In a spark transmitter, as in claim 7, said source of primary power having sufficient voltage to momentarily break the spark gaps down, said ballast impedance being large enough to interrupt the flow of currents and quench the gaps.

12. In a spark transmitter, as in claim 11, said radio frequency resonant network including said spark gaps in the rest position being so balanced that the two gap currents are equal and oppositely directed in said primary winding.

13. In a spark transmitter of damped electromagnetic waves having circuit means including a radio-frequency resonant network, an antenna and a differential spark gap device including electrodes and at least two connected spark gaps, the method of balancing the two gap currents flowing into said radio frequency resonant network consisting of adjusting the relative gap spacings until the average radio frequency output is a minimum.

14. In a spark transmitter, as in claim 9, said inductance being shunted by a condenser, said parallel arrangement of inductance and condenser, including the capacity of the spark gaps, being resonated at a chosen frequency.

15. In a spark transmitter of damped electromagnetic waves, as in claim 2, said vibratory means comprised of a mass and an elastic diaphragm, said further means comprised of conducting surfaces on said mass serving as some of said electrodes, said mass being fastened at the center of said diaphram the extremity of which is supported between two insulating cylindrical half-shells, said cylindrical half-shells supporting other of said electrodes in the proximity of the conducting surfaces of said mass, said electrodes being conductively connected to said circuit means.

16. In a spark transmitter of damped electromagnetic waves, as in claim 15, said circuit means comprised of a radio frequency transformer having mutually coupled primary and secondary windings, a buffer impedance, a battery, and an antenna, said cylindrical half-shells supporting two of said electrodes in the proximity of said mass and on opposite sides of said mass, said mass supported electrode surfaces in the rest position being centrally located between said cylindrical half-shell supported electrodes and in parallel alignment therewith, said primary winding having a center tap, said cylindrical half-shell supported electrodes being connected across said primary winding, said mass supported electrode surfaces being commonly connected to one terminal of said ballast impedance, the other terminal of said ballast impedance being connected to one terminal of said battery, the second terminal of the latter being connected to said center tap of said primary winding, said antenna being connected to said secondary winding.

17. In a spark transmitter of damped electromagnetic waves, as in claim 2, said vibratory means comprised of a piston having mass supported by a spring from inside a closed chamber, said further means comprised of a liquid in contact with said mass and of a gas in contact with said liquid and occupying the space between and around said electrodes, said chamber being relatively rigid and containing said liquid and gas, said electrodes being supported by and insulated from said chamber and conductively connected to said circuit means.

18. In a spark transmitter of damped electromagnetic waves, as in claim 17, said electrodes being divided into two groups, said liquid in contact with said mass being divided into two portions with one portion on one side of said mass and the second portion on the opposite side of said mass so that as the mass moves the two said liquid portions move in opposite directions, said gas likewise being divided into two portions with a portion in contact with each liquid portion and occupying the space around and between the electrodes of said electrode groups.

19. In a spark transmitter of damped electromagnetic waves, as in claim 18, with the pressure of the two said gas portions equal when said mass is in the rest position.

20. In a spark transmitter of damped electromagnetic waves, as in claim 18, each of said electrode groups having two terminals with each terminal connected to at least one electrode, said radio frequency resonant network being comprised of a radio frequency transformer having mutually coupled primary and secondary windings, said primary winding having a center tap, said circuit means having in addition a ballast impedance, one terminal of one of said electrode groups connected to one terminal of said primary winding, one terminal of the second of said electrode groups connected to a second terminal of said primary winding, the second terminals of each of said electrode groups commonly connected to one terminal of said ballast impedance, the other terminal of said ballast impedance being connected to one terminal of said source of primary power, the second terminal of the latter being connected to said center tap of said primary winding, said antenna being connected to said secondary winding.

21. In a spark transmitter of damped electromagnetic waves, as in claim 17, the area of said mass in contact with said liquid being greater than the area of said liquid in contact with said gas.

22. In a spark transmitter of damped electromagnetic waves, as in claim 2, said vibratory means comprised of a piston and at least one dense lamination fastened to said piston and a spring supporting said piston and lamination from a rigid base, said further means comprised of a block of dense matter supported from said base and surrounding and shielding said electrodes, two relatively long narrow canals in close proximity to each other in said block of dense matter opening on said electrodes and a source of radiation opposite said canals and supported from said base, said lamination interposed between said source of radiation and said canals and generally controlling entry to said canals by radiations from said source, said lamination and canals being relatively disposed that when one of said canals is open to radiations from said source, the other is blocked to radiations from said source, said electrodes being supported by and insulated from said block of dense matter and conductively connected to said circuit means.

23. In a spark transmitter of damped electromagnetic waves, as in claim 22, said circuit means comprised of a radio frequency transformer having mutually coupled primary and secondary windings, a buffer impedance, a battery and an antenna, said primary winding having a center-tap, one end terminal of said primary connected to one of said electrodes, the other end terminal of said primary connected to a second of said electrodes, other of said electrodes connected to one terminal of said buffer impedance, the other terminal of said buffer impedance being connected to one terminal of said battery, the other terminal of said battery connected to said primary center tap, said antenna being connected to said secondary winding.

24. In a spark transmitter of damped electromagnetic waves, as in claim 15, said other electrodes having very thin insulating films attached thereto and in intimate proximity therewith, said insulating films having faults and being in physical contact with said conducting surfaces on said mass.

25. In a spark transmitter of damped electromagnetic waves, as in claim 2, said vibratory means comprised of a mass, an elastic diaphragm, two springs and two electrodes, said further means comprised of insulated surfaces on some of said electrodes and underneath said insulated surfaces conducting surfaces, said insulated surfaces having a multiplicity of electrical faults, said mass being fastened at the center of said diaphragm and having portions on either side of said diaphragm, the extremity of said diaphragm supported between two cylindrical half shells, said cylindrical half shells supporting other of said electrodes in the proximity of said insulated surfaces of some of said electrodes, one of said springs on either side of said mass portions and in mechanical contact therewith at one extremity of each, the other extremity of each spring in mechanical contact with said electrodes having insulated surfaces, said springs acting to hold said insulated surfaces in contact with other of said electrodes.

26. In a spark transmitter of damped electromagnetic waves, as in claim 25, said springs being cylindrical bellows.

27. A differential transducer comprised of at least three electrode surfaces in circuit arrangement with a radio-frequency tank circuit, a source of electromotive force and an antenna, said electrode surfaces substantially parallel to and in alignment with each other and separated by means of very thin insulating films, said insulating films having imperfections, said imperfections filled with ionizable substances, said electrode surfaces elastically suspended with respect to each other and maintained at a potential difference by means of said source of electromotive force.

References Cited in the file of this patent
UNITED STATES PATENTS

| | | |
|---|---|---|
| 1,340,963 | Lemmon | May 25, 1920 |
| 1,623,745 | Murray | Apr. 5, 1927 |
| 2,410,087 | Litton | Oct. 29, 1946 |
| 2,653,306 | Piety | Sept. 22, 1953 |
| 2,840,695 | Peterson | June 24, 1958 |
| 2,909,759 | Cook | Oct. 20, 1959 |